United States Patent [19]

Chung

[11] Patent Number: 4,486,504
[45] Date of Patent: * Dec. 4, 1984

[54] SOLVENTLESS, ULTRAVIOLET RADIATION-CURABLE SILICONE COATING COMPOSITIONS

[75] Inventor: Rack H. Chung, Clifton Park, N.Y.

[73] Assignee: General Electric Company, Waterford, N.Y.

[ * ] Notice: The portion of the term of this patent subsequent to Sep. 7, 1999 has been disclaimed.

[21] Appl. No.: 359,989

[22] Filed: Mar. 19, 1982

[51] Int. Cl.$^3$ .......................... C08F 2/50; C08F 20/28; C08G 77/14

[52] U.S. Cl. .................. 428/412; 204/159.13; 428/418; 428/447; 526/279; 528/32; 528/25; 528/10; 524/728; 524/800; 524/806

[58] Field of Search .................. 204/159.13; 428/412

[56] References Cited

U.S. PATENT DOCUMENTS

| | | | |
|---|---|---|---|
| 3,629,165 | 12/1971 | Holdstock | 260/2.5 AH |
| 3,708,225 | 1/1973 | Misch et al. | 351/160 |
| 3,865,588 | 2/1975 | Ohto et al. | 204/159.13 |
| 3,976,497 | 8/1976 | Clark | 106/287 SE |
| 3,981,897 | 9/1976 | Crivello | 260/440 |
| 3,986,997 | 10/1976 | Clark | 260/29.2 M |
| 4,027,073 | 5/1977 | Clark | 428/412 |
| 4,101,513 | 7/1978 | Fox et al. | 204/159.13 |
| 4,136,102 | 1/1979 | Crivello | 260/440 |
| 4,156,035 | 5/1979 | Tsao et al. | 204/159.15 |
| 4,222,835 | 9/1980 | Dixon | 204/159.16 |
| 4,250,203 | 2/1981 | Schlesinger | 204/159.11 |
| 4,310,600 | 1/1982 | Cross | 428/447 |
| 4,348,462 | 9/1982 | Chung | 204/159.13 |

Primary Examiner—Melvyn I. Marquis
Assistant Examiner—A. H. Koeckert
Attorney, Agent, or Firm—Hedman, Gibson, Costigan & Hoare

[57] ABSTRACT

An ultraviolet radiation-curable silicone coating composition is disclosed which, when applied to a solid substrate, provides an abrasion-resistant coating firmly adhered thereon. The silicone coating composition is free of residual solvent and free of toxic hydroxy acrylates, and is prepared from the hydrolysis products of acryloxy-functional silanes and/or glycidoxy-functional silanes, colloidal silica and a photoinitiator.

30 Claims, No Drawings

SOLVENTLESS, ULTRAVIOLET RADIATION-CURABLE SILICONE COATING COMPOSITIONS

BACKGROUND OF THE INVENTION

This invention relates to a solventless ultraviolet radiation-curable protective coating composition. More particularly, it relates to a silicone coating composition which contains no water or organic solvent and, when applied to a substrate, may be quickly cured by exposure to UV radiation to form a protective, abrasion-resistant coating thereon.

Recently, the substitution of glass glazing with transparent materials which do not shatter or are more resistant to shattering than glass has become widespread. For example, transparent glazing made from synthetic organic polymers is now utilized in public transportation vehicles such as trains, buses, taxis and airplanes. Lenses for eye glasses and other optical instruments, as well as glazing for large buildings, also employ shatter-resistant, transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and often requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature and good dimensional stability. It is also self-extinguishing, and it is easily fabricated. Acrylics, such as polymethylmethacrylate, are also widely used transparent plastics for glazing.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225; 3,986,997, 3,976,497 and 4,027,073, for example, describe such compositions.

In commonly-assigned copending U.S. application Ser. No. 964,910, filed Nov. 30, 1978, coating compositions having improved resistance to moisture and humidity and ultraviolet light are disclosed. It was discovered therein that, in direct contrast to the teachings of U.S. Pat. No. 3,986,997, compositions having a basic pH, i.e., 7.1–7.8, do not immediately gel but in fact provide excellent abrasion-resistant coatings on solid substrates.

Recent discoveries offer a significant advantage over many of the heretofore known silicone coating compositions in that they do not require heat in order to initiate the cure reaction. Instead, ultraviolet radiation is employed, expending considerably less thermal energy than conventional heat cure systems. See, e.g., U.S. Pat. No. 4,310,600.

Ultraviolet light is one of the most widely used types of radiation because of its relatively low cost, ease of maintenance, and low potential hazard to industrial users. Besides avoiding high temperature cure environments, rapid photo-induced polymerizations utilizing UV light for curing hard coatings offer several other significant advantages. First, the cure time is much shorter, leading to substantial economic benefits. Second, heat sensitive materials can be safely coated and cured with UV light without the use of thermal energy which could damage the substrate. Additionally, the lower levels of solvents used reduces the necessity for expensive and time-consuming pollution abatement procedures.

Although it is known that colloidal silica can be incorporated into heat cured coating systems, applicant has discovered that such colloidal silicas can be utilized to improve the abrasion resistance of ultraviolet light-curable coatings. Copending U.S. application Ser. No. 129,297, filed Mar. 11, 1980, discloses a radiation-curable hard-coating composition which requires the use of the acid hydrolysis product of an alkoxy functional silane. Copending U.S. application Ser. No. 167,622, filed July 11, 1980, now U.S. Pat. No. 4,348,462, provides UV-curable coatings which possess even greater abrasion resistance and yet do not require the use of alkoxy silanes; these results are accomplished through the specific combination of colloidal silica with acryloxy functional silanes or water miscible hydroxy acrylates, or preferably both, with catalytic amounts of UV sensitive photoinitiators.

The UV-curable coating compositions of the present invention improve upon the adhesion, abrasion resistance and resistance to yellowing on exposure to UV-radiation offered by the aforementioned compositions. In addition, the instant compositions are essentially solvent-free, and the use of highly toxic hydroxy-funtional acrylates is eliminated. Also eliminated from the instant compositions is free water, which increases shipping weight and necessitates added drying time before curing.

SUMMARY OF THE INVENTION

Accordingly, it is one object of the present invention to provide a novel protective coating for solid substrates.

Another object of this invention is to provide a radiation-curable coating for solid substrates which, when applied to the substrate, provides an improved abrasion-resistant surface thereto.

Another object of the present invention is to provide a UV-curable coating composition which is essentially solvent-free and avoids the use of toxic hydroxy acrylates.

Still another object of the present invention is to provide a silicone coating composition especially well-suited for providing an improved abrasion-resistant surface to transparent substrates without impairing the optical clarity of the substrate.

A further object of the present invention is to provide a coating composition which results in an improved abrasion-resistant surface when applied to metals and metallized surfaces.

These and other objects are accomplished herein by a solventless ultraviolet radiation-curable coating composition comprising:

(A) 100 parts by weight silica in the form of a colloidal dispersion;

(B) 5 to 500 parts by weight of the acid hydrolysis product of
(i) an acryloxy-functional silane of the formula:

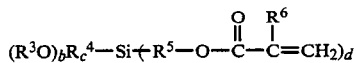

wherein $R^3$ and $R^4$ are the same or different monovalent hydrocarbon radicals, $R^5$ is a divalent hydrocarbon radical having from 2 to 8 carbon atoms, $R^6$ is hydrogen or a monovalent hydrocarbon radical b is an integer from 1 to 3, c is an integer from 0 to 2, and d is an integer equal to 4-b-c; or
(ii) a glycidoxy-functional silane of the formula:

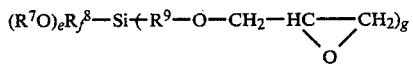

wherein $R^7$ and $R^8$ are the same or different monovalent hydrocarbon radicals, $R^9$ is a divalent hydrocarbon radical having from 2 to 8 carbon atoms, e is an integer from 1 to 3, f is an integer from 0 to 2, and g is an integer equal to 4-e-f; or
(iii) mixtures of (i) and (ii); and
(C) a catalytic amount of an ultraviolet light sensitive photoinitiator.

In other features, the coating compositions of the present invention will additionally contain 10–500 parts by weight of a non-silyl acrylate. These compounds have been found to dramatically increase adhesion and abrasion resistance of the cured product when used in conjunction with colloidal silica.

In other features, the compositions will also contain photo-modifiable compounds which, while allowing the coating composition to cure on exposure to ultraviolet radiation, are structurally modified by the radiation to form ultraviolet screening compounds. This structural change, known as "Fries rearrangement", gives the cured coating and substrate added protection against the cracking, yellowing or delamination effects associated with prolonged ultraviolet light exposure.

DETAILED DESCRIPTION OF THE INVENTION

The coating compositions of this invention are prepared by thoroughly admixing the silica and silane components and then removing solvents under reduced pressure. Optional acrylate components and curing catalysts are then added to form coating compositions which may be applied directly to a substrate, such as polyester film, and cured in one pass of UV radiation in a matter of seconds to yield adherent, abrasion-resistant coatings.

The silica components should be in the form of a silicon dioxide ($SiO_2$) dispersed in solvents. For example, Nalco 1034 ® is a dispersion of 34% $SiO_2$ and 66% water by weight. Colloidal silica is available in basic or acidic form. Either may be utilized; however, the acidic form (low sodium content) is preferred.

To the colloidal silica is added 5 to 500 parts and preferably 50 to 200 parts of an acryloxy functional silane or glycidoxy functional silane, or a mixture of both types of silanes. The silanes help impart high abrasion resistance to the coating compounds. It has been found, however, that with silanes and colloidal silica alone, adhesion may be poor. To improve adhesion, there may be added, to the acryloxy and glycidoxy functional silanes, from 10 to 500 parts, preferably 50 to 200 parts, of a non-silyl acrylate material. Especially preferred acrylates for the purposes herein are non-hydroxy acrylates. Non-hydroxy acrylates are utilized because they are less toxic and not as miscible in water as the hydroxy acrylates. In the solventless systems of this invention, any water or other solvent remaining after mixing the ingredients is removed.

The above-described ingredients are catalyzed with catalytic amounts of ultraviolet light sensitive photoinitiators or blends of such initiators. Radical-type initiators can be utilized alone, but employing a combination of radical and cationic photoinitiators results in improved abrasion resistance. In fact, when acidic colloidal silica is used, it is essential that such a combination of photoinitiators be used. The radical-type catalysts are used to cure the acryloxy functional portions of the composition whereas the cationic-type catalysts cure the siloxane portions.

The catalytic amounts of these photoinitiators may vary but ordinarily the cationic-type catalyst, such as the hereinafter-described onium salts, will be present in an amount of, approximately, 0.05 to 5.0% by weight based upon the amounts of ingredients A, B, and non-silyl acrylate (if present), and preferably will be present in an amount of from 0.1 to 1.5% by weight. The radical-type photoinitiators will ordinarily be present in an amount of, approximately, 0.5 to 5.0% by weight of ingredients, A, B, and non-silyl acrylate (if present), are preferably will be present in an amount of, approximately, 1.0 to 3.0% by weight.

The second major component of the present compositions is the acid hydrolysis product of an acryloxy-functional silane or the acid hydrolysis product of a glycidoxy-functional silane or mixtures thereof. The acryloxy-functional silane has a general formula

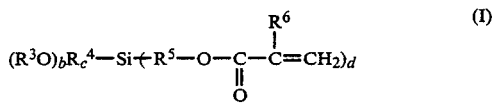

wherein $R^3$ and $R^4$ are the same or different monovalent hydrocarbon radicals, including halogenated species of such radicals. Preferably, $R^3$ and $R^4$ will be lower alkyl radicals such as methyl, ethyl, propyl, etc., but they may also be other saturated and unsaturated species including vinyl, aryl, etc. $R^5$ is a divalent hydrocarbon radical having from 2 to 8 carbon atoms. $R^6$ is a hydrogen or a monovalent hydrocarbon radical. The letter b is an integer from 1 to 3, c is an integer from 0 to 2 and is an integer equaling 4-b-c. In many of the embodiments of the present invention, b will ordinarily be 3, c will be 0 and d will equal 1. Specific examples of acryloxy-functional silanes contemplated herein include:
3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-methacryloxyethyltriethoxysilane
2-acryloxyethyltriethoxysilane Such acryloxy-functional silanes are commercially available. 3-methacryloxypropyltrimethoxysilane, for example, may be obtained from Union Carbide.

The second, or silane, component of the coating composition may also be a glycidoxy-functional silane instead of an acryloxy-functional silane, or it may be a combination or mixture of both types of silanes. A glycidoxy-functional silane has the general formula

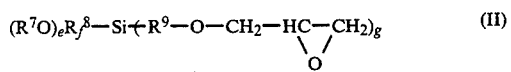

wherein $R^7$ and $R^8$ are the same or different monovalent hydrocarbon radicals as described above for $R^3$ and $R^4$, $R^9$ is a divalent hydrocarbon radical having from 2 to 8 carbon atoms, the letter e is an integer from 1 to 3, f is an integer from 0 to 2 and g is an integer equaling 4-e-f. Specific examples of useful glycidoxy-functional silanes include the following:

3-glycidoxypropyltrimethoxysilane
2-glycidoxyethyltrimethoxysilane
3-glycidoxypropyltriethoxysilane
2-glycidoxyethyltriethoxysilane These glycidoxy-functional silanes are also commercially available, for example, from Petrarch Systems, Inc.

The optional third component (c) of these hard coating compositions is a non-silyl acrylate compound. Such compounds have been found to dramatically increase the abrasion resistance of the cured product when used with the colloidal silica described above. These acrylate compositions are considered to be non-silyl functional to distinguish them from the acryloxy functional silanes described above. They are esters of acrylic acid, and the most preferred are non-hydroxy acrylates.

Among the acrylates which may be utilized in the present invention are:
diethylene glycol diacrylate
triethylene glycol diacrylate
tetraethylene glycol diacrylate
trimethylol propane triacrylate
tetrahydro furfuryl methacrylate
1-6-hexanediol diacrylate Any solvent remaining or generated after thorough admixture of the components must be removed, preferably before the addition of the catalyst described hereinafter. This is preferably done in vacuo or at reduced pressure with gentle heating, e.g., to about 40° C.

To the mixture of the first two or three components must he added a catalytic amount of (C) a photoinitiator. Effective photoinitiators are radiation sensitive aromatic halonium, sulfonium or phosphonium salts all of which are described in the literature.

Cationic photoinitiators are described by Crivello in numerous U.S. patents and applications, such as the following, for example, which are hereby incorporated by reference: U.S. Pat. No. 4,136,102, issued Jan. 23, 1979 and U.S. Pat. No. 3,981,897, issued Sept. 21, 1976. Such cationic photoinitiators can have the general formula

In this formula, X is a radical selected from I, P or S. M is a metal or metalloid and Q is a halogen radical selected from Cl, F, Br, or I. $R^{10}$ is hydrogen or a monovalent hydrocarbon radical having from 1 to 12 carbon atoms. h is an integer having the value of 4 to 6 inclusive, and n is an integer having the value of 2 or 3.

The expression $MQ_h^-$ applies to any number of ionic species but preferably will be selected from $SbF_6^-$, $AsF_6^-$, $BF_4^-$ and $PF_6^-$. Particular cationic catalysts include diphenyl iodonium salts of tetrafluoro borate, hexafluoro phosphate, hexafluoro arsenate, and hexafluoro antimonate; and triphenyl; sulfonium salts of tetrafluoro borate, hexafluoro phosphate, hexafluoro phosphate, hexafluoro arsenate, and hexafluoro antimonate.

It is ordinarily preferable to utilize approximately 0.1 to 1.5 parts by weight of the cationic photoinitiator for every 100 parts by weight of the mixture of ingredients A, B, and a non-silyl acrylate as described above. However, depending upon individual desired process parameters such as rate of cure and ultimate abrasion resistance, the amount of the photoinitiator can range from approximately 0.05 to 5 parts by weight per 100 parts of the mixture of ingredient A, B, and optional non-silyl acrylate.

These cationic photoinitiators are particularly effective for initiating a cross-linking reaction upon exposure to ultraviolet radiation. Good hard coatings having excellent adhesion can thus be obtained when a coating composition of this invention is applied to a substrate and exposed to radiation such as that provided by UV lamps.

Improved abrasion resistance can be obtained with the same hard coating compositions when, in addition to the cationic photoinitiators described above, there is also utilized a radical-type initiator which is effective for cross-linking or self-condensing the acryloxy-functional portions of the silanes contained in the composition. Such radical photoinitiators include among others, benzoin ethers, alpha-acryloxime esters, acetophenone derivatives, benzil ketals and ketone amine derivatives. Specific examples of these photoinitiators include ethyl benzoin ether, isopropyl benzoin ether, dimethoxyphenyl acetophenone, and diethoxy acetophenone.

The mixed components A, B, and C can be effectively catalyzed to form satisfactory radiation-curable hard coatings by combining 100 parts by weight of such products and mixtures with from, approximately, 0.5 to 5.0 parts by weight of a combination of photoinitiators. The photoinitiator combination will be comprised of, approximately, 10 to 90% by weight of a cationic-type initiator, such as diphenyliodoniumhexafluoroarsenate, and the remaining portion is a radical-type initiator such as ethylbenzoin ether.

Other additives and modifying agents, such as thickeners, pigments, dyes and the like, may also be added to the coating compositions of the present invention, preferably before the addition of the catalyst. A particularly desirable additive has been found to be a small amount of a polysiloxane polyether copolymer flow control additive. It has been found that these compounds have a beneficial effect in preventing the occurrence of undesirable flowmarks and dirtmarks which sometimes occur with the application of the coating composition to a substrate. A particularly useful polysiloxane polyether copolymer for the purposes herein is known as SF-1066, available from the General Electric Company; another is BYK-300, sold by Mallinkrodt. The preparation, further description and structural formulae for these polysiloxane polyether copolymers are described in U.S. Pat. No. 3,629,165, which is incorporated herein by reference. Generally, the polysiloxane polyether copolymers are employed in amounts of from about 2.5% to about 15% by weight of the total solids content of the composition.

Also useful as additives to the present coating compositions are photo-modifiable compounds which undergo a reaction known as "Fries rearrangement" to form UV-screening compounds. Such compounds are structurally modified by UV radiation energy, and the modified compounds themselves screen UV radiation. For example, compound IV (below) having the structure

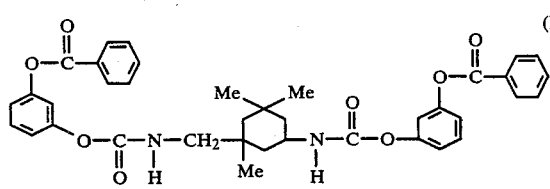
(IV)

will convert via photo-induced "Fries-rearrangement" to Compound V having the structure

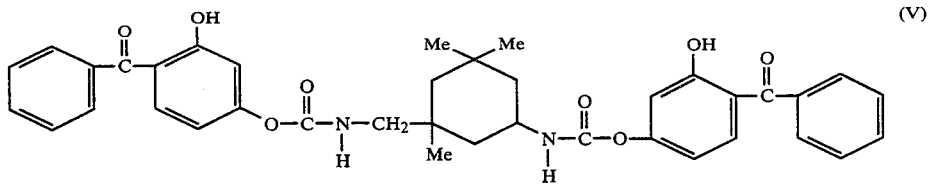
(V)

which is a UV screener.

Such photo-modifiable compounds are an important discovery in the art of UV-curable coatings, because they provide a means of introducing UV screening materials into UV-curable coating compositions and thereby enhancing the weatherability, or resistance to cracking, yellowing and delamination, in the final cured coating. Obviously, incorporating conventional UV screens into UV-curable compositions will hinder the cure. Incorporating photo-modifiable compounds into the instant compositions, however, will permit the curing process while at the same time converting to a UV-screening compound which will thereafter act to diminish the harmful effects of UV radiation on the cured coating.

Preparation, and a more complete description, of the photo-modifiable compounds contemplated herein is described in Examples 12 and 13, which appear infra. Preferred such compounds for the purposes herein include compound (IV) above, and also

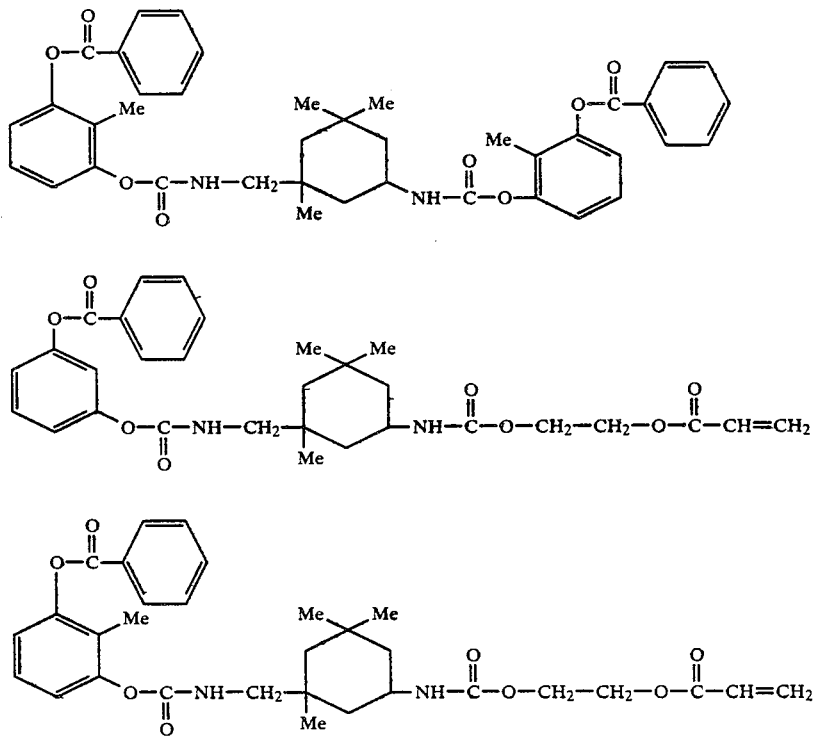

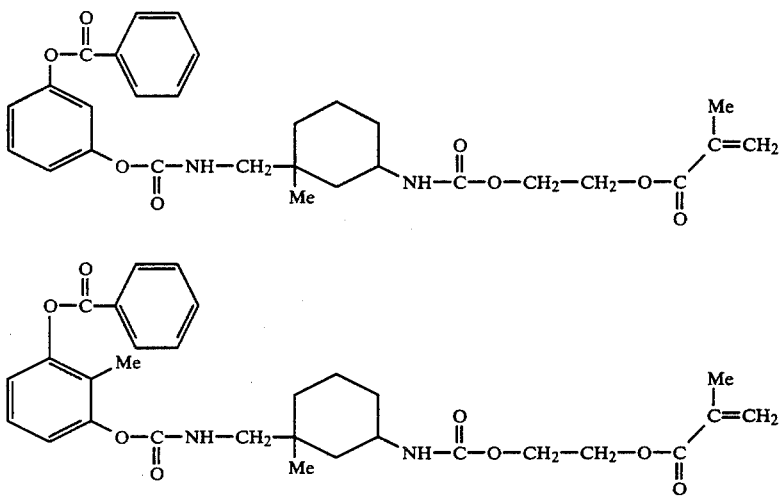

A UV-curable coating composition of the present invention is ordinarily coated on at least one surface of some solid substrate. The solid substrate may be comprised of a synthetic organic polymer or metal or even glass, or a synthetic organic polymer substrate which has a metallized surface.

Prior to the composition being coated on a substrate there may optionally be included a priming step wherein a primer such as a thermosetting acrylic emulsion is first applied to the substrate. After the coating composition is applied to the substrate or the primed substrate, the coating may be cured thereon by an effective amount of UV-radiation, such as that emitted, for example, from a Hanovia 550-watt lamp or a PPG Processor Model QC1202.

The coating compositions of the present invention can be applied to a variety of solid substrates by conventional methods, such as flowing, spraying or dipping, to form a continuous surface film. Optimum coating thicknesses are obtained by slow dip coating procedures. Substrates which are especially contemplated herein are transparent and non-transparent plastics and metals. More particularly, these plastics are synthetic organic polymeric substrates such as acrylic polymers like poly(methylmethacrylate); polyesters, such as poly(ethylene terephthalate), poly (butylene terephthalate), etc.; polyamides; polyimides; acrylonitrile-styrene copolymers; styrene-acrylonitrile-butadiene copolymers; polyvinyl chloride; butyrates; polyethylene and the like. The coating compositions of this invention are especially useful as coatings for polyester films, polycarbonates, such as poly (bisphenol-A carbonate) and those polycarbonates known as Lexan ® (sold by General Electric Company); and as coatings for injection molded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment of the substrate, including the use of primers, the coatings can be adhered to substantially all solid substrates. A hard coating having all of the aforementioned characteristics and advantages is obtained by exposure of the coated substrate to ultraviolet radiation for a period sufficient to induce the crosslinking and condensation (and Fries rearrangement if photo-modifiable compounds are employed) associated with full cure.

Coating thicknesses may vary, but for improved abrasion resistance coating thickensses of 3-15 microns, preferably about 5 microns, are utilized. In the following example $\Delta\%H_{500}$ is a quantitative measure of haze on coated products according to the Taber Abrasion Resistance Test.

In order that those skilled in the art may better understand how to practice the present invention, the following examples are given by way of illustration and not by way of limitation.

EXAMPLE 1

A mixture of 100 parts by weight colloidal silica (Nalco 1034a ®) and 300 parts by weight 3-methacyrloxypropyltrimethoxysilane (MPTMS) and 150 parts by weight isopropyl alcohol was refluxed for 30 minutes. After cooling to room temperature, solvents were removed under reduced pressure. The solvent-free hydrolyzate was combined with 5 parts by weight of $\alpha,\alpha$-diethoxyacetophenone and 3 parts by weight triphenyl sulfonium hexafluoroarsenate. This composition was coated to a thickness of 0.5 mils on a Lexan ® panel, which was then passed through a PPG Model QC1202 UV processor under a nitrogen atmosphere at 50 psi with a conveyor speed of 20 ft./min. One pass through the system resulted in a coating which was hard and hazy.

EXAMPLE 2

A mixture of 100 parts by weight colloidal silica, 223 parts by weight MPTMS and 150 parts by weight isopropyl alcohol was stirred at room temperature for 3 hours. 71 parts by weight of 3-glycidoxypropyltrimethxoy silane (GPTMS) were then added. After stirring at room temperature for 3 hours, solvents were removed in vacuuo. To the thick resin were added 69 parts by weight diethyleneglycoldiacrylate (DEGDA) and 69 parts by weight of trimethylol propane triacrylate (TMPTA). Next were added 4 parts by weight of triphenyl sulfonium hexfluoroarsenate and 8 parts by weight diethoxyacetophenone (DEAP), followed by 2 parts by weight BYK-300 flow control agent. A film of about 0.11 mils was applied to a Lexan ® panel which was passed through a UV processor as in Example 1.

The coated Lexan ® panel was tested for abrasion resistance on a Taber Abraser, which involves measuring the increase in haze (Δ%H) after being subjected to 500 cycles of abrasive CF10 wheels. Coating adhesion was also tested, using the crosshatch adhesion test, involving scribing a criss-cross pattern (grid) on the coated surface, applying the 710 Tape and pulling it away. 3 tape pulls with no adhesion loss is considered passing. The following results were observed:

| No. | Silicone % | Acrylates % | Δ % H$_{500}$ | Adhesion |
|---|---|---|---|---|
| 1 | 100 | — | Hazy | Fail |
| 2 | 66 | 34 | 8.5 | Pass |
| 3 | 50 | 50 | 8.2 | Pass |
| 4 | 33 | 67 | 7.7 | Pass |
| 5 | 25 | 75 | 7.6 | Pass |
| 6 | 20 | 80 | 7.3 | Pass |

EXAMPLE 3

A mixture of 100 parts by weight MPTMS and 250 parts by weight GPTMS was added drop-wise to 100 parts by weight colloidal silica at room temperature. The mixture was then stirred at room temperature for 14 hours. The resultant mixture was concentrated under reduced pressure at 40° C., at which time 3 parts by weight of triphenyl sulfonium hexafluoroarsenate and 3 parts by weight DEAP were added. This composition was coated on polyester film at 7 mils thickness and cured in a PPG 1202 UV processor by 1 pass at 20 fpm/200 W to yield a clear hard coating.

Examples 4–9

EXAMPLE 4

A mixture of 40 parts by weight of colloidal silica and 40 parts by weight of MPTMS and 80 parts by weight of GPTMS was stirred at room temperature for 2 hours. The organic volatiles were then removed under reduced pressure at 40° C. 0.4 parts by weight of bis(p-isopropylphenyl)iodoniumhexafluoroarsenate, 0.4 parts by weight of diethoxyacetophenone and 0.5 parts by weight of a polymer were added to the clear silicone residue. The mixture was then coated on polyester film at 7 mils thickness and cured on a PPG QC 1202 UV processor with 1 pass at 20 fpm/300 W in an air atmosphere. Excellent fallings and and steel wool abrasion resistance were obtained.

EXAMPLE 5

Another composition was prepared following the procedure of Example 4 using the following ingredients and proportions:

| Ingredients | Proportion |
|---|---|
| colloidal silica | 20 parts by weight |
| MPTMS | 20 parts by weight |
| GPTMS | 50 parts by weight |
| bis(p-isopropylphenyl)hexafluoroarsenate | 0.3 parts by weight |
| DEAP | 0.5 parts by weight |
| acetyl acetone | 2.0 parts by weight |

A clear abrasion-resistant coating was obtained.

EXAMPLE 6

Another composition was prepared following the procedure of Example 4 using the following ingredients and proportions:

| Ingredients | Proportion |
|---|---|
| colloidal silica | 100 parts by weight |
| MPTMS | 200 parts by weight |
| GPTMS | 500 parts by weight |
| Di-toluyl iodonium hexafluoroarsenate | 3.6 parts by weight |
| DEAP | 5.0 parts by weight |
| polysiloxane | 0.5 parts by weight |

A clear abrasion-resistant coating was obtained.

EXAMPLE 7

Another composition was prepared following the procedure of Example 4 using the following ingredients and proportions:

| Ingredients | Proportion |
|---|---|
| colloidal silica | 150 parts by weight |
| MPTMS | 200 parts by weight |
| GPTMS | 500 parts by weight |
| Di-toluyl iodonium hexafluoroarsenate | 4.0 parts by weight |
| DEAP | 5.0 parts by weight |
| polysiloxane | 0.8 parts by weight |

A clear abrasion-resistant coating was obtained.

EXAMPLE 8

Another composition was prepared following the procedure of Example 4 using the following ingredients and proportions:

| Ingredients | Proportion |
|---|---|
| colloidal silica | 100 parts by weight |
| MPTMS | 100 parts by weight |
| GPTMS | 400 parts by weight |
| Triphenyl sulfonium hexafluoroarsenate | 3.0 parts by weight |
| polysiloxane | 0.8 parts by weight |
| acetyl acetone | 5.0 parts by weight. |

A clear abrasion-resistant coating was obtained.

EXAMPLE 9

Another composition was prepared following the procedure of Example 4 using the following ingredients and proportions:

| Ingredients | Proportion |
|---|---|
| colloidal silica | 100 parts by weight |
| MPTMS | 150 parts by weight |
| β-(3.4-epoxycyclohexyl)-ethyltrimethoxysilane | 400 parts by weight |
| Diphenyliodoniumhexafluoroarsenate | 3.5 parts by weight |
| DEAP | 4.5 parts by weight |
| polysiloxane | 0.9 parts by weight |

A clear abrasion-resistant coating was obtained.

EXAMPLE 10

A composition was prepared following the procedure of Examples 1 and 2 using the following ingredients and proportions:

| Ingredients | Proportion |
| --- | --- |
| colloidal silica | 200 parts by weight |
| MPTMS | 600 parts by weight |
| isopropyl alcohol | 300 parts by weight |

The following results were observed:

| No. | Silicone % | Acrylates % | $Ph_3S^+AsF_6^-$ (%) | DEAP (%) | $\Delta\% H_{500}$ |
| --- | --- | --- | --- | --- | --- |
| I | 100 | 0 | 0.5 | 0.4 | Hazy |
| II | 66 | 34 | 0.4 | 0.6 | 11.0 |
| III | 50 | 50 | 0.3 | 0.8 | 9.0 |
| IV | 33 | 67 | 0.2 | 1.0 | 6.9 |
| V | 25 | 75 | 0.1 | 1.2 | 6.4 |

EXAMPLE 11

A composition was prepared following the preparation of Example 2 using the following ingredients and proportions:

| Ingredients | Proportion |
| --- | --- |
| colloidal silica | 100 parts by weight |
| MPTMS | 149 parts by weight |
| GPTMS | 142 parts by weight |
| DEAP | 70 parts by weight |
| TMPTA | 70 parts by weight |

The following results were observed:

| No. | Silicone % | Acrylates % | $Ph_3S^+AsF_6^-$ (%) | DEAP (%) | $\Delta\% H_{500}$ |
| --- | --- | --- | --- | --- | --- |
| I | 100 | 0 | 0.2 | 0.2 | [poor adhesion] |
| II | 66 | 34 | 0.1 | 0.2 | 5.2 |
| III | 50 | 50 | 0.1 | 0.2 | 5.3 |
| IV | 33 | 67 | 0.1 | 0.2 | 7.3 |
| V | 25 | 76 | 0.1 | 0.2 | 7.7 |
| VI | 20 | 80 | 0.1 | 0.2 | 8.0 |

EXAMPLE 12

To test the effect of photo-modifiable UV-screener precursor compounds in coatings of this type, Compound IV, shown above, was synthesized as follows:

To a mixture of ½ mol. of isophoronediisocyanate and 1 mol. of resorcinol monobenzoate and 500 ml. of dry tetrahydrofuran was added, drop-wise, 1 mol. of triethylamine. The temperature was maintained below 40° C. After stirring overnight, the resulting mixture was concentrated under reduced pressure to remove the tetrahydrofuran and triethylamine. The crude product was passed through a short silicone column and eluted with ethyl acetate, to yield a thick, clear Compound IV.

An experimental coating composition was also prepared, as follows:

To 175 parts by weight colloidal silica was added, drop-wise, 165 parts by weight MPTMS over a period of 40 minutes at room temperature. The mixture was stirred for 16 hours at room temperature. Excess water and solvents were removed under reduced pressure with the aid of pure isopropyl alcohol. The clear hydrolyzate was then treated with basic ion exchange resin (Amberlite IRA-400 ®). The organic solvents were again removed, and 72 parts by weight DEGDA and 72 parts by weight of TMPTA were added. Thereafter, 6.4 parts by weight benzophenone and 5.4 parts by weight methyldiethanolamine (radical catalysts) were added.

Compound IV was added to the experimental composition in varying amounts, then coated on Lexan ® and cured on a PPG 1202 UV processor with 1 pass at 20 fpm/300 W in an air atmosphere to yield the following results:

| No. | % Comp. IV | $\Delta\% H_{500}$ | QUV |
| --- | --- | --- | --- |
| 1 | 0 | 3.0 | 20 hrs. cracks |
| 2 | 3 | 3.2 | 153 |
| 3 | 6 | 4.9 | 153 |
| 4 | 9 | 5.4 | 189 |
| 5 | 12 | 5.5 | 300 |
| 6 | 15 | 5.7 | 300 |

EXAMPLE 13

To a mixture of 29.0 parts by weight of methylresorcinolmonobenzoate and 100 ml. of anhydrous tetrahydrofuran was added 0.2 parts by weight of dibutyltindilaurate and 14 parts by weight of isophoronediisocyanate at room temperture. After stirring for 17 hours the solvent was removed to yield Compound VI shown below.

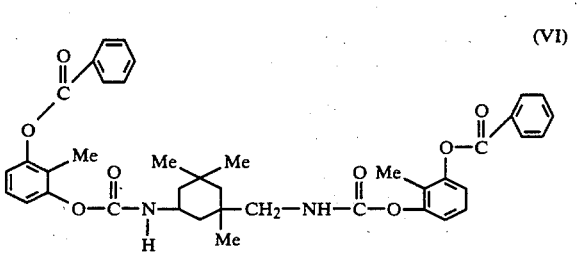

(VI)

The Compound VI was then tested in a coating composition obtained from 45% silicone resin and 55% acrylates. The results are shown below:

| | $\Delta\% H_{1000}$ | | QUV (hrs.) | |
| --- | --- | --- | --- | --- |
| % Compound VI | Air-Cure | $N_2$-Cure | Air-Cure | $N_2$-Cure |
| 0 | 4.3 | 11.1 | 336 | 336 |
| 3 | 2.5 | 11.0 | 361 | 404 |
| 6 | 5.7 | 8.5 | 473 | 473 |
| 9 | 3.5 | 8.7 | 527 | 573 |
| 12 | 4.0 | 9.7 | 745 | 640 |

EXAMPLE 14

A composition was prepared following the procedure of Example 13 using the following ingredients and proportions:

| Ingredients | Proportion |
| --- | --- |
| colloidal silica | 520 parts by weight |
| MPTMS | 100 parts by weight |
| phenyltrimethoxysilane | 10 parts by weight |
| diethyleneglycoldiacrylate | 33 parts by weight |
| TMPTA | 32 parts by weight |
| benzophenone | 8 parts by weight |

| Ingredients | Proportion |
| --- | --- |
| methyldiethanolamine | 8 parts by weight |

Compound VI was added to the coating in varying amounts, and the following data after UV cure on polycarbonate plaques (20 fpm in an air atmosphere) were obtained:

| % Compound VI | Δ % H$_{1000}$ | QUV (hrs.) |
| --- | --- | --- |
| 0 | 4.7 | 58 |
| 3.0 | 4.5 | 58 |
| 6.0 | 4.9 | 167 |
| 9.0 | 5.2 | 222 |
| 12.0 | 5.5 | 336 |
| 15.0 | 5.7 | 534 |

Many variations will suggest themselves to those skilled in this art in light of the above detailed description. All such obvious modifications are within the full intended scope of the appended claims.

I claim:

1. A solventless ultraviolet radiation-curable coating composition free of hydroxy acrylates comprising:
   (A) 100 parts by weight silica in the form of a colloidal dispersion;
   (B) 5 to 500 parts by weight of an acid hydrolysis product of
   (i) an acryloxy-functional silane having a general formula:

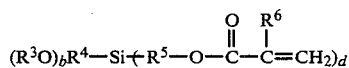

wherein R$^3$ and R$^4$ are the same or different monovalent hydrocarbon radicals, R$^5$ is a divalent hydrocarbon radical having from 2 to 8 carbon atoms, R$^6$ is hydrogen or a monovalent hydrocarbon radical, b is an integer from 1 to 3, c is an integer from 0 to 2, and d is an integer equaling 4-b-c; or
   (ii) a glycidoxy-functional silane having a general formula:

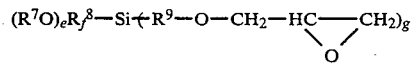

wherein R$^7$ and R$^8$ are the same or different monovalent hydrocarbon radicals, R$^9$ is a divalent hydrocarbon radical having from 2 to 8 carbon atoms, e is an integer from 1 to 3, f is an integer from 0 to 2, and g is an integer equaling 4-e-f; or
   (iii) a mixture of (i) and (ii); and
   (C) a catalytic amount of an ultraviolet light sensitive photoinitiator or mixture of photoinitiators; wherein residual solvent has been removed from said coating composition at reduced pressure.

2. A composition as defined in claim 1 which additionally contains 10 to 500 parts by weight of a non-silyl, non-hydroxy acrylate.

3. A composition as defined in claim 1 or 2 wherein said acryloxy-functional silane is selected from the group consisting of:
3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-acryloxyethyltriethoxysilane.

4. A composition as defined in claim 1 or 2 wherein said glycidoxy-functional silane is selected from the group consisting of:
3-glycidoxypropyltrimethoxysilane
2-glycidoxyethyltrimethoxysilane
3-glycidoxypropyltriethoxysilane
2-glycidoxyethyltriethoxysilane.

5. A composition as defined in claim 2 wherein said non-silyl acrylate is selected from the group consisting of:
diethylene glycol diacrylate
triethylene glycol diacrylate
tetraethylene glycol diacrylate
trimethylol propane triacrylate
tetrahydro furfuryl methacrylate
1-6-hexanediol diacrylate.

6. A composition as defined in claim 1 or 2 wherein said photoinitiator is a radiation sensitive aromatic onium salt having the formula:

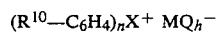

wherein X is a radical selected from I, P or S; and M is a metal or metalloid and Q is a halogen radical selected from Cl, F, Br, or I; R$^{10}$ is hydrogen or a monovalent hydrocarbon radical having 1 to 12 carbon atoms, h is an integer having a value of 4 to 6 inclusive, and n is an integer having a value of 2 or 3.

7. A composition as defined in claim 6 wherein MQ$_h^-$ is selected from SbF$_6^-$, AsF$_6^-$, BF$_4^-$, and PF$_6^-$.

8. A composition as defined in claim 6 wherein said photoinitiator is further combined with 0.5 to 5.0 parts of a radical-type photoinitiator.

9. A composition as in claim 8 wherein said radical-type photoinitiator is selected from ethyl benzoin ether, isopropyl benzoin ether, dimethoxyphenylacetophenone and diethoxyacetophenone.

10. A composition as defined in claim 1 or 2 which also contains a small amount of polysiloxane polyether copolymer flow control additive.

11. A composition as defined in claim 1 or 2 which additionally contains a photo-modifiable compound which is capable of converting to an ultraviolet radiation screening agent upon curing of the coating composition.

12. A composition as defined in claim 11 wherein the photo-modifiable compound has the formula:

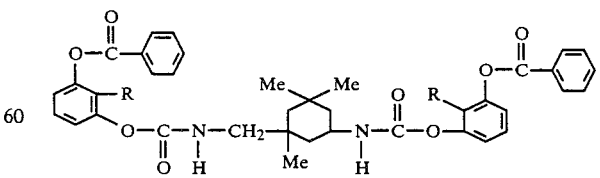

where R is hydrogen (H) or methyl (Me).

13. A process for preparing a solventless ultraviolet radiation curable coating composition free of hydroxy acrylates comprising:
(1) Combining (A) 100 parts by weight silica in the form of a colloidal dispersion;

(B) 5 to 500 parts by weight of the acid hydrolysis product of (i) an acryloxy-functional silane of the formula:

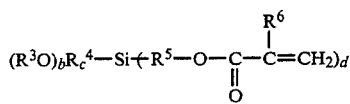

wherein $R^3$ and $R^4$ are the same or different monovalent hydrocarbon radicals, $R^5$ is a divalent hydrocarbon radical having from 2 to 8 carbon atoms, $R^6$ is hydrogen or a monovalent hydrocarbon radical, b is an integer from 1 to 3, c is an integer from 0 to 2, and d is an integer equal to 4-b-c; or (ii) a glycydoxy-functional silane of the formula:

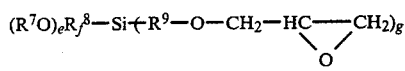

wherein $R^7$ and $R^8$ are the same or different monovalent hydrocarbon radicals, $R^9$ is a divalent hydrocarbon radical having from 2 to 8 carbon atoms, e is an integer from 1 to 3, f is an integer from 0 to 2, and g is an integer equal to 4-e-f; or (iii) mixtures of (i) and (ii);

(2) adding a catalytic amount of an ultraviolet light sensitive photoinitiator; and thereafter (3) removing residual solvent at reduced pressure.

14. The process of claim 13 which contains the additional step, before step (2), of adding 10–500 parts by weight of a non-silyl, non-hydroxy acrylate.

15. The process of claim 13 or 14 which also contains a small amount of polysiloxane polyether copolymer flow control additive.

16. The process of claims 13 or 14 which additionally contains a photo-modifiable compound which is capable of converting to an ultraviolet radiation screening agent upon curing of the coating composition.

17. The process of claim 16 wherein the photo-modifiable compound has the formula:

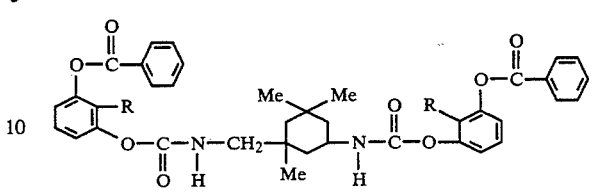

where R is hydrogen (H) or methyl (Me).

18. The cured product of claim 1 or 2.

19. A solid substrate having at least one surface coated with the coating composition of claim 1 or 2.

20. An article as defined in claim 19 wherein the solid substrate is comprised of a synthetic organic polymer.

21. An article as defined in claim 19 wherein said solid substrate is a metal.

22. An article as defined in claim 19 wherein said solid substrate is a synthetic organic polymer having a metallized surface.

23. An article as defined in claim 20 wherein said polymer is a transparent polymer.

24. An article as defined in claim 20 wherein said polymer is a polycarbonate.

25. An article as defined in claim 24 wherein said polycarbonate is transparent.

26. An article as defined in claim 24 wherein said polycarbonate is a poly (bisphenol-A carbonate).

27. An article as defined in claim 19 wherein the coating composition has been cured on said surface of said solid substrate by an effective amount of ultraviolet radiation.

28. An article as defined in claim 19 wherein said surface of said solid substrate has been primed with a primer composition prior to being coated.

29. An article as defined in claim 28 wherein said primer composition is comprised of a thermosetting acrylic emulsion.

30. An article as defined in claim 20 wherein said polymer is polymethylmethacrylate.

* * * * *